United States Patent
Ha et al.

(10) Patent No.: US 11,068,150 B2
(45) Date of Patent: Jul. 20, 2021

(54) METHOD FOR COMPENSATING FOR PRESSURE VALUE OF FORCE SENSOR AND ELECTRONIC DEVICE USING SAME

(71) Applicant: Samsung Electronics Co., Ltd., Suwon-si (KR)

(72) Inventors: Sangsu Ha, Suwon-si (KR); Seonghun Kim, Suwon-si (KR); Jungsoo Kim, Suwon-si (KR); Taehoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/762,750

(22) PCT Filed: Dec. 27, 2018

(86) PCT No.: PCT/KR2018/016747
§ 371 (c)(1),
(2) Date: May 8, 2020

(87) PCT Pub. No.: WO2019/135548
PCT Pub. Date: Jul. 11, 2019

(65) Prior Publication Data
US 2020/0264751 A1    Aug. 20, 2020

(30) Foreign Application Priority Data
Jan. 2, 2018 (KR) .................... 10-2018-0000161

(51) Int. Cl.
*G06F 3/0488* (2013.01)
*G06F 3/041* (2006.01)
(Continued)

(52) U.S. Cl.
CPC .......... *G06F 3/0488* (2013.01); *G06F 3/0412* (2013.01); *G06F 3/16* (2013.01); *G06F 21/32* (2013.01); *G06F 2203/04105* (2013.01)

(58) Field of Classification Search
CPC ........ G06F 3/0488; G06F 3/0412; G06F 3/16; G06F 21/32; G06F 2203/04105;
(Continued)

(56) References Cited

U.S. PATENT DOCUMENTS

| 2015/0002479 A1 | 1/2015 | Kawamura |
| 2015/0296062 A1 | 10/2015 | Lee |

(Continued)

FOREIGN PATENT DOCUMENTS

| JP | 2015-011401 A | 1/2015 |
| KR | 10-2013-0060716 A | 6/2013 |

(Continued)

*Primary Examiner* — Koosha Sharifi-Tafreshi
(74) *Attorney, Agent, or Firm* — Jefferson IP Law, LLP

(57) ABSTRACT

Various embodiments of the present invention relate to a method for compensating for a pressure value of a force sensor and an electronic device using the same, the electronic device comprising: a touch screen display; a force sensor bonded to a lower portion of the touch screen display; a memory; and a processor electrically connected to the touch screen display, the force sensor, and the memory, wherein the processor is configured to: obtain a pressure value of the touch screen display and a pressure value of the force sensor; measure the correlation between the obtained pressure value of the touch screen display and the pressure value of the force sensor; identify a spacing state between the touch screen display and the force sensor by using the correlation; determine whether the spacing state is of a predetermined distance or less and compensate for the pressure value for determining whether to operate the force sensor by using a predetermined reference value when the spacing state is of the predetermined distance or less, thereby sensing the spacing state in real time when spacing occurs between the touch screen display and the force sensor (Continued)

of the electronic device, and compensating for the pressure value of the force sensor such that user convenience can be improved. In addition to the embodiments disclosed in the present invention, other various embodiments are possible.

15 Claims, 18 Drawing Sheets

(51) Int. Cl.
*G06F 3/16* (2006.01)
*G06F 21/32* (2013.01)

(58) Field of Classification Search
CPC ........ G06F 3/167; G06F 3/0418; G06F 21/83; G06K 9/00; G08B 3/10; G08B 5/22; G08B 21/18
See application file for complete search history.

(56) References Cited

U.S. PATENT DOCUMENTS

| | | |
|---|---|---|
| 2016/0041648 A1 | 2/2016 | Richards |
| 2017/0108992 A1 | 4/2017 | Lee et al. |
| 2017/0131840 A1 | 5/2017 | Deichmann et al. |
| 2017/0285746 A1* | 10/2017 | Kim ..................... G06F 3/041 |
| 2017/0316250 A1 | 11/2017 | Roh et al. |

FOREIGN PATENT DOCUMENTS

| | | |
|---|---|---|
| KR | 10-2015-0117958 A | 10/2015 |
| KR | 10-2017-0016981 A | 2/2017 |
| KR | 10-2017-0043801 A | 4/2017 |
| KR | 10-2017-0088807 A | 8/2017 |
| KR | 10-2017-0122386 A | 11/2017 |

\* cited by examiner

METHOD FOR COMPENSATING FOR PRESSURE VALUE OF FORCE SENSOR AND ELECTRONIC DEVICE USING SAME

TECHNICAL FIELD

Various embodiments of the disclosure relate to a method for compensating a pressure value of a force sensor and an electronic device using the same.

BACKGROUND ART

With increased use of electronic devices such as portable terminals, various functions have come to be provided to electronic devices.

An electronic device may obtain multiple types of information through various sensors, and may carry out various functions by using the obtained information.

For example, an electronic device may use a force sensor to sense a pressure input through a touch on a touch screen display.

DETAILED DESCRIPTION OF INVENTION

Technical Problem

In the force sensor, sensing sensitivity may be reduced as the strength of bonding of the force sensor to the touch screen display is reduced due to an impact to an electronic device, bonding failure, etc.

When the strength of bonding between a touch screen display and a force sensor of the electronic device is reduced, a gap may be formed between the touch screen display and the force sensor.

When a user of the electronic device performs force input on the touch screen display in the state in which the gap is formed, the pressure value of the force sensor may be smaller than the pressure value input by the user.

Variation may occur in the sensitivity of the force sensor due to the strength of bonding of the force sensor bonded to the rear surface of the touch screen display. Therefore, in order to maintain the accuracy of a sensing value of the force sensor, it is required to sense, in real time, whether the gap has been formed and to compensate the pressure value of the force sensor.

Various embodiments of the disclosure may provide: a force sensor pressure value compensation method capable of sensing a spaced-apart state in real time when a gap is formed between a touch screen display and a force sensor and compensating a pressure value of the force sensor; an electronic device using the same; and a computer-readable storage medium in which a program for carrying out the method is stored.

Solution to Problem

An electronic device according to various embodiments of the disclosure may include: a touch screen display; a force sensor bonded to a lower portion of the touch screen display; a memory; and a processor electrically connected to the touch screen display, the force sensor, and the memory, wherein the processor may be configured to: obtain a pressure value of the touch screen display and a pressure value of the force sensor; measure a correlation between the obtained pressure value of the touch screen display and the pressure value of the force sensor; identify a spaced-apart state between the touch screen display and the force sensor by using the correlation; determine whether the spaced-apart state corresponds to a predetermined distance or less; and compensate, using a predetermined reference value, a pressure value for determining whether to operate the force sensor when the spaced-apart state corresponds to the predetermined distance or less.

A method for compensating a pressure value of a force sensor according to various embodiments of the disclosure may include: obtaining, by a processor, a pressure value of a touch screen display and a pressure value of a force sensor; measuring, by the processor, a correlation between the obtained pressure value of the touch screen display and the pressure value of the force sensor; identifying, by the processor, a spaced-apart state between the touch screen display and the force sensor by using the correlation; determining whether the spaced-apart state corresponds to a predetermined distance or less; and compensating, using a predetermined reference value, a pressure value for determining whether to operate the force sensor when the spaced-apart state corresponds to the predetermined distance or less.

A computer-readable storage medium, which has stored therein a program for carrying out a method for compensating a pressure value of a force sensor included in an electronic device according to various embodiments of the disclosure, may perform a method including: obtaining a pressure value of a touch screen display and a pressure value of the force sensor; measuring a correlation between the obtained pressure value of the touch screen display and the pressure value of the force sensor; identifying a spaced-apart state between the touch screen display and the force sensor by using the correlation; determining whether the spaced-apart state corresponds to a predetermined distance or less; and compensating, using a predetermined reference value, a pressure value for determining whether to operate the force sensor when the spaced-apart state corresponds to the predetermined distance or less.

Advantageous Effects of Invention

According to various embodiments of the disclosure, when a gap is formed between a touch screen display and a force sensor of an electronic device, it is possible to improve user usability by sensing a spaced-apart state in real time and compensating a pressure value of the force sensor.

According to various embodiments of the disclosure, it is possible to quickly inform a user of the spaced-apart state between a touch screen display and a force sensor of an electronic device via a user interface and/or an audio.

MODE FOR THE INVENTION

Figure 1:
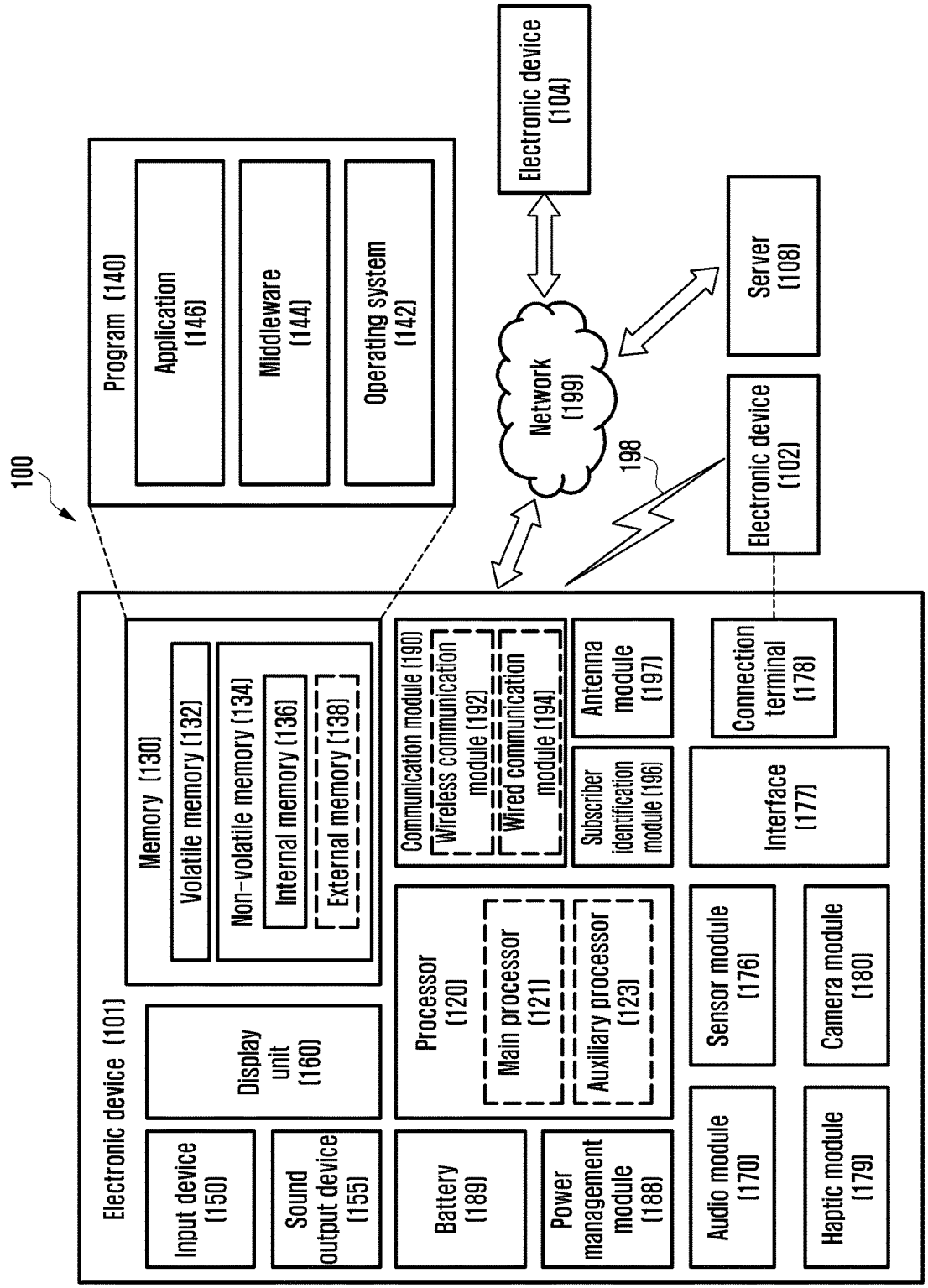
FIG. 1 is a block diagram of an electronic device in a network environment according to various embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 2:
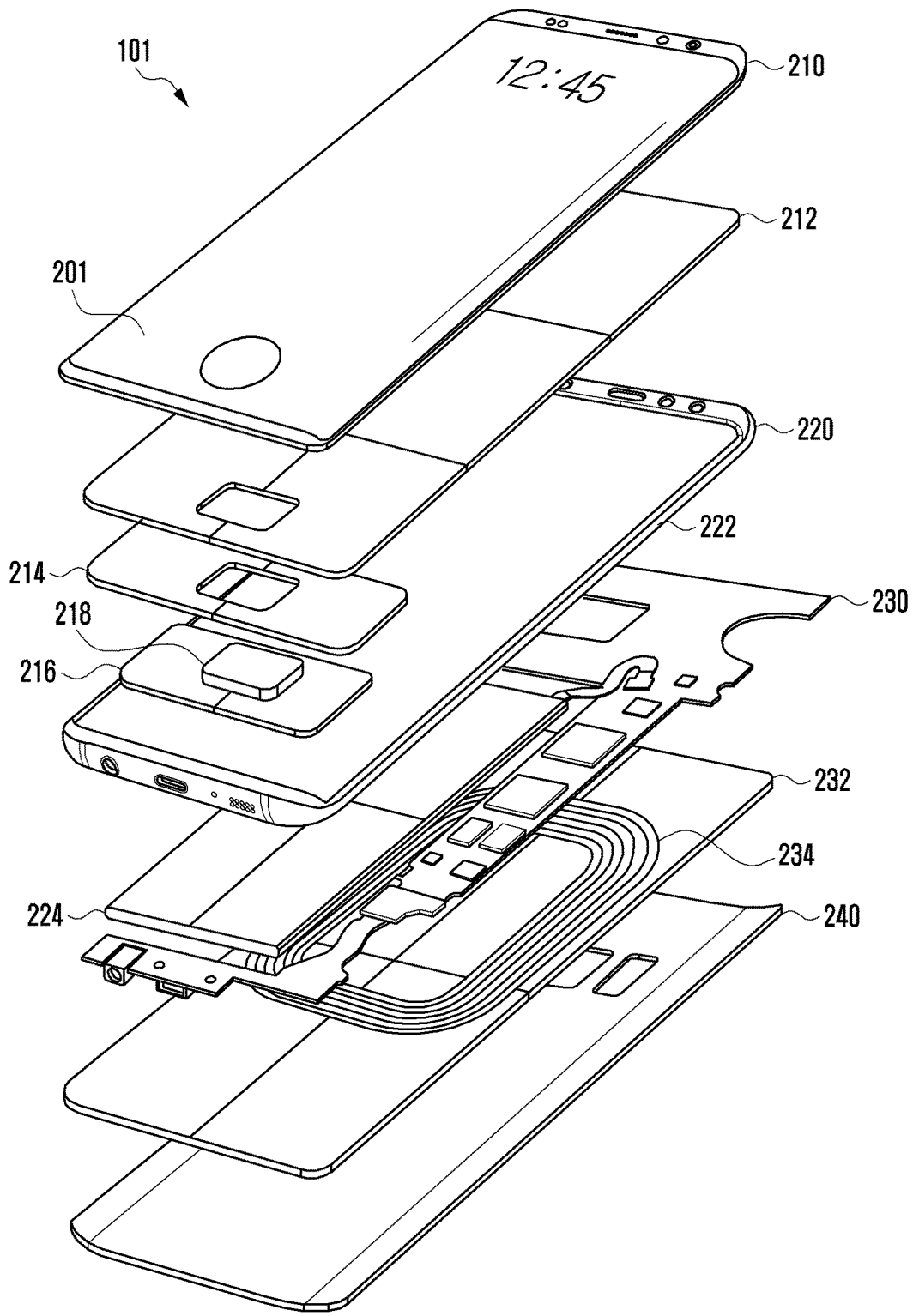
FIG. 2 is an exploded perspective view schematically illustrating the configuration of an electronic device according to various embodiments of the disclosure.

FIG. 2 is an exploded perspective view schematically illustrating the configuration of an electronic device according to various embodiments of the disclosure.

Referring to FIG. 2, the electronic device 101 according to various embodiments of the disclosure may include: a first plate 210; a digitizer panel 212; a force sensor 214; a fingerprint sensor 216; a home key 218; a housing 220; a battery 224; a printed circuit board (PCB) 230; a wireless charging FPCB 232; a wireless charging coil 234; and/or a second plate 240.

According to one embodiment, the first plate 210, the digitizer panel 212, the force sensor 214, the fingerprint sensor 216, and the home key 218 may be received in the upper side of the housing 220. The battery 224, the printed circuit board (PCB) 230, the wireless charging FPCB 232, the wireless charging coil 234, and the second plate 240 may be received in the lower side of the housing 220. In the electronic device 101, at least one of the elements described above may be omitted, or another element may be added. The electronic device 101 may use an outer exposed surface of the housing 220 as an antenna.

The first plate 210 may be a cover (e.g. a glass cover) forming the front surface of the electronic device 101. The first plate 210 may visually expose a touch screen display 201 through at least a part thereof. The touch screen display

201 may display an image. The touch screen display 201 may perform an input function and/or a display function. According to various embodiments, the touch screen display 201 may include a display unit 160 in FIG. 1.

The digitizer panel 212 may receive an X-coordinate and a Y-coordinate of user touch input via the touch screen display 201.

The force sensor 214 may sense a touch pressure input via the touch screen display 201 and/or the digitizer panel 212. The force sensor 214 may be formed in the shape of a force touch panel, and may be used in place of the home key 218 described below. The home key 218 may be a predetermined function key.

The fingerprint sensor 216 may authenticate a user based on fingerprint information of the user. For example, the fingerprint sensor 216 may receive fingerprint information of a user via the touch screen display 201 or the force sensor 214, and may authenticate the user based on the received fingerprint information.

The home key 218 may be disposed on the fingerprint sensor 216. Alternatively, the home key 218 may be disposed together with the fingerprint sensor 216 in the same plane. When the home key 218 and the fingerprint sensor 216 are arranged together, information about a fingerprint of a user of an electronic device 101, input via the touch screen display 201 or the force sensor 214, may be obtained. The home key 218 may be formed as a pressable key button or a touch key.

The housing 220 may include at least partial side member 222 so as to receive the above-described elements of the electronic device 101. The housing 220 including the side member 222 may form the side surface of the electronic device 101. The outer exposed surface of the side member 222 may be at least partially formed of a conductive material (e.g. a metal). The side member 222 of the housing 220 may be used as an antenna of the electronic device 101. The housing 220 may surround a gap between the first plate 210 and the second plate 240 by using the side member 222 when the first plate 210 and the second plate 240 are laminated.

The battery 224 may supply power necessary for operation of the electronic device 101. According to various embodiments, the battery 224 may include the battery 189 in FIG. 1.

The printed circuit board (PCB) 230 may include: a processor (e.g. the processor 120 in FIG. 1) necessary for the operation of the electronic device 101; a memory (e.g. the memory 130 in FIG. 1); an audio module (e.g. the audio module 170 in FIG. 1); a communication module (e.g. the communication module 190 in FIG. 1); and/or a power management module (e.g. the power management module 188 in FIG. 1). The printed circuit board (PCB) 230 may include a flexible printed board assembly (FPCB) and/or a printed board assembly (PBA) on which various types of connectors such as a battery contact are formed. The communication module may include a wireless communication circuit of the electronic device 101. The wireless communication circuit may be electrically connected to the processor. At least a part of the side member 222 of the housing 220 may be connected to at least a part of the wireless communication circuit. According to various embodiments, the processor, the memory, and the audio module, which are included in the printed circuit board (PCB) 230, may include a processor 370, a memory 350, and an audio module 360 in FIG. 3 described below.

The wireless charging FPCB 232 may charge the battery 224 in a wireless manner. The wireless charging FPCB 232 may include a wireless charging coil 234. The wireless charging FPCB 232 may include a coil antenna for short-range communication, such as near-field communication (NFC) and/or magnetic secure transmission (MST).

The second plate 240 may be a cover (e.g. a battery cover) forming the rear surface of the electronic device 101. The second plate 240 may be arranged to face the side opposite the first plate 210. The second plate 240 may be positioned opposite the first plate 210 so as to face the first plate 210.

Figure 3:
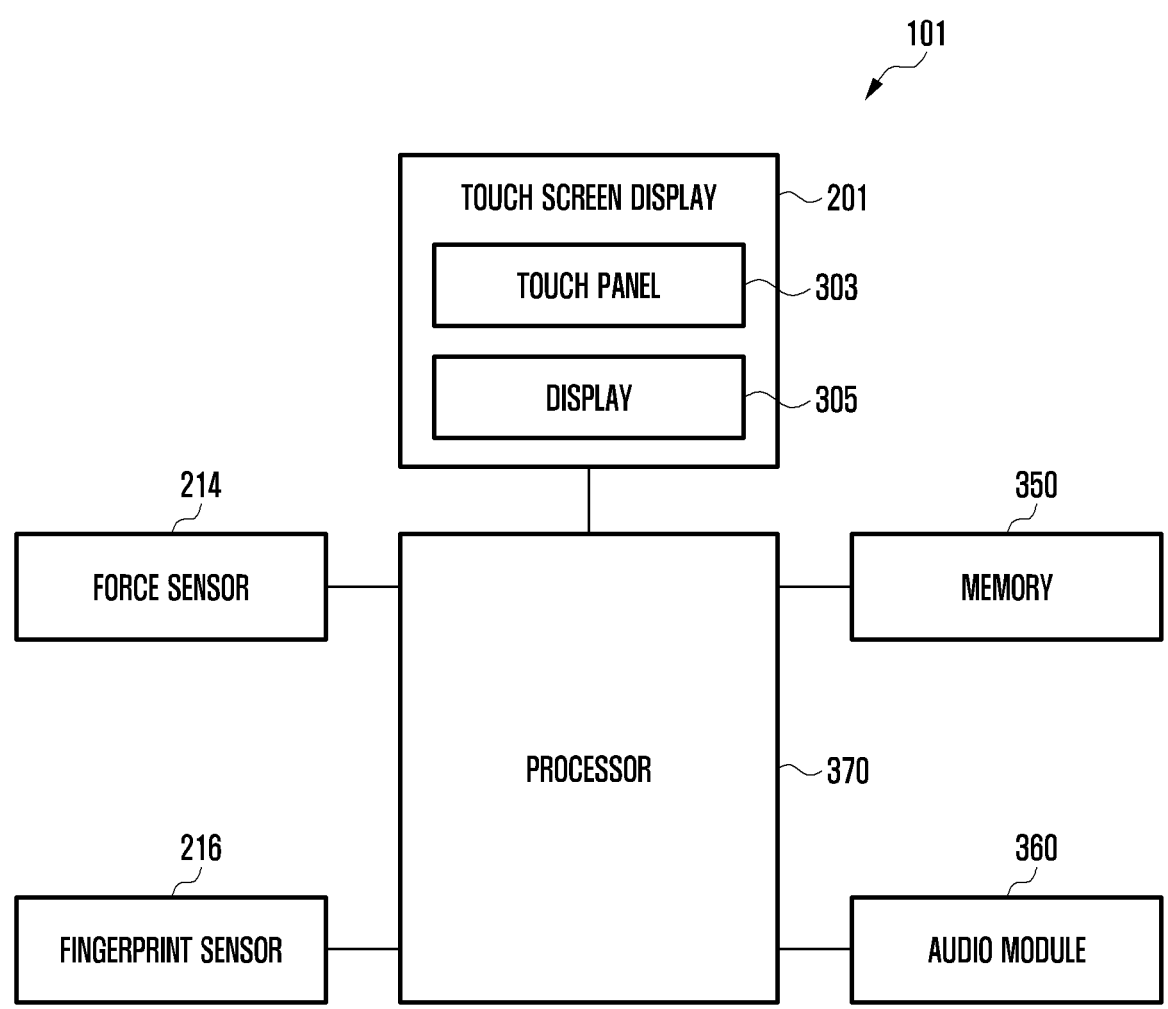
FIG. 3 is a block diagram schematically illustrating the configuration of an electronic device according to various embodiments of the disclosure.

FIG. 3 is a block diagram schematically illustrating the configuration of an electronic device according to various embodiments of the disclosure.

Referring to FIG. 3, an electronic device (e.g. the electronic device 101 in FIG. 1 or FIG. 2) according to various embodiments of the disclosure may include: a touch screen display 201; a force sensor 214; a fingerprint sensor 216; a memory 350; an audio module 360; and a processor 370.

The touch screen display 201 may receive a touch signal input by a finger of a user. When a gap is formed between the touch screen display 201 and the force sensor 214 bonded to the rear surface thereof, the touch screen display 201 may display a user interface for indicating the formation of the gap.

According to various embodiments of the disclosure, the touch screen display 201 may perform an input function and/or a display function. To this end, the touch screen display 201 may include a touch panel 303 and a display 305. The touch panel 303 may be configured as a capacitive-overlay-type, resistive-overlay-type, or infrared-beam-type touch sensor, or may be configured as a pressure sensor. In addition to the sensors, all types of sensor devices capable of sensing a touch or pressure of an object may be configured as the touch panel 303 of the present embodiment. The touch panel 303 may sense touch input of a user of the electronic device 101, may generate a sensing signal, and may transmit the sensing signal to the processor 370. The sensing signal may include coordinate data (e.g. X, Y, Z) which the user has provided by inputting a touch. When the user inputs a touch position movement operation, the touch panel 303 may generate a sensing signal including coordinate data of a touch position movement path, and may transmit the sensing signal to the processor 370. The display 305 may be formed of a liquid crystal display (LCD), an organic light-emitting diode (OLED), an active matrix organic light-emitting diode (AMOLED), or the like, and may visually provide the user with a menu of the electronic device 101, input data, function-setting information, and various other types of information.

The force sensor 214 may sense pressure input through a touch on the touch panel 303 included in the touch screen display 201, and may measure the magnitude of the sensed pressure. The force sensor 214 may be disposed beneath the touch screen display 201. The force sensor 214 may generate a predetermined electrical signal in response to the touch input on the touch panel 303. For example, when a user of the electronic device 101 touches a predetermined portion of the touch screen display 201, a pressure corresponding to the touch may be applied to the force sensor 214. The force sensor 214 may generate an electrical signal corresponding to the applied pressure, and may transmit the generated electrical signal to the processor 370.

According to various embodiments of the disclosure, the force sensor 214 may be smaller than the touch panel 303. A thin-film-type or film-type pressure sensor may be used as the force sensor 214. For example, the force sensor 214 may include a force register sensor, a diaphragm, and a silicone-based pressure sensor.

According to one embodiment, the pressure value of the touch panel 303 of the touch screen display 201 may increase in proportion to the pressure value of the force sensor 214. According to one embodiment, the touch screen display 201 may recognize a position input via the touch panel 303 by an X-coordinate and a Y-coordinate. The pressure value of the touch screen display 201 may be calculated using the sensibility and area based on raw data of touch panel 303 stored in the memory 350.

The fingerprint sensor 216 may obtain fingerprint information of the user of the electronic device 101. The fingerprint sensor 216 may be disposed so as to cover all or at least a part of the region of the touch screen display 201. The fingerprint sensor 216 may obtain fingerprint information of the user while a pressure is applied to the force sensor 214 by a touch of the user on the touch screen display 201. The fingerprint information obtained by the fingerprint sensor 216 may be stored as image information, and may be compared with fingerprint information of the user stored in the memory 350 so as to be used for user authentication.

According to various embodiments of the disclosure, the fingerprint sensor 216 may obtain the fingerprint information of the user by using at least one among an optical scheme, a capacitive scheme, an ultrasonic scheme, and an IR scheme. For example, the optical scheme can obtain fingerprint information of a user by capturing a fingerprint image using a photosensitive diode. The capacitive scheme can obtain fingerprint information by using the principle in which portions (ridges) of a fingerprint, which touch an electrode, are sensed and portions (valleys) of a fingerprint, which do not touch the electrode, are not sensed. The ultrasonic scheme can generate ultrasonic waves through a piezo element and can obtain fingerprint information using the path difference between the ultrasonic waves which hit the ridges and valleys of a fingerprint and are then reflected.

The memory 350 may store a reference value for a pressure value of the touch panel 303 of the touch screen display 201 and a pressure value of the force sensor 214. The reference value may be calculated using raw data based on an area and a sensitivity to touch input on the touch screen display 201 and pressure applied to the force sensor 214. When a gap is formed between the touch screen display 201 and the force sensor 214, the memory 350 may store various user interfaces and/or audio information for indicating the formation of the gap. The memory 350 may store various fingerprints which can be used to authenticate the user of the electronic device 101.

According to various embodiments of the disclosure, the memory 350 may perform a function of storing a program, an operating system (OS), various applications, and input/output data for processing or control by the processor 370, and may store a program for controlling the overall operation of the electronic device 101. The memory 350 may store a user interface (UI) provided in the electronic device 101 and various types of configuration information required to perform functions in the electronic device 101.

When a gap is formed between the touch screen display 201 and the force sensor 214, the audio module 360 (e.g. the audio module 170 in FIG. 1) may output an audio signal indicating the formation of the gap.

The processor 370 may control functions and operations of the touch screen display 201, the force sensor 214, the fingerprint sensor 216, the memory 350, and the audio module 360 in the electronic device 101. For example, when the spaced-apart state between the touch screen display 201 and the force sensor 214 corresponds to a predetermined distance or less, the processor 370 may compensate a pressure value for determining whether to operate the force sensor 214 by a predetermine reference value. The processor 370 may be configured to output, when a gap is formed between the touch screen display 201 and the force sensor 214, a user interface and/or audio signal for indicating the formation of the gap. The processor 370 may be configured to perform a function stored in the memory 350.

According to one embodiment, the processor 370 may obtain a touch pressure value input via the touch screen display 201. The processor 370 may obtain a pressure value input via the force sensor 214. The processor 370 may measure a correlation between the obtained pressure value of the touch screen display 201 and the pressure value of the force sensor 214. The processor 370 may identify a spaced-apart state between the touch screen display 201 and the force sensor 214 by using the measured correlation between the pressure value of the touch screen display 201 and the pressure value of the force sensor 214. For example, the processor 370 may identify that the force sensor 214 is spaced a predetermined distance apart from the touch screen display 201 by using the correlation in which the pressure value of the force sensor 214 becomes smaller than the touch pressure value of the touch screen display 201 when a gap is formed between the touch screen display 201 and the force sensor 214. The processor 370 may determine whether the spaced-apart state between the touch screen display 201 and the force sensor 214 corresponds to a predetermined distance or less. The processor 370 may compensate, using a predetermined reference value, a pressure value for determining whether to operate the force sensor 214 when the spaced-apart state between the touch screen display 201 and the force sensor 214 corresponds to a predetermined distance or less. When the spaced-apart state between the touch screen display 201 and the force sensor 214 exceeds the predetermined distance, the processor 370 may determine that the pressure value for determining whether to operate the force sensor 214 cannot be compensated by the predetermined reference value, and may output, via the touch screen display 201 and/or the audio module 360, a user interface and/or an audio signal for indicating that the spaced-apart state has exceeded the predetermined distance.

According to various embodiments of the disclosure, the processor 370 may perform functions of: controlling the overall operation of the electronic device 101 and the signal flow between elements in the electronic device 101; and processing data. The processor 370 may include a central processing unit (CPU), an application processor, and a communication processor. The processor 370 may be formed as a single core processor or a multi-core processor, and may include multiple processors.

Figure 4:
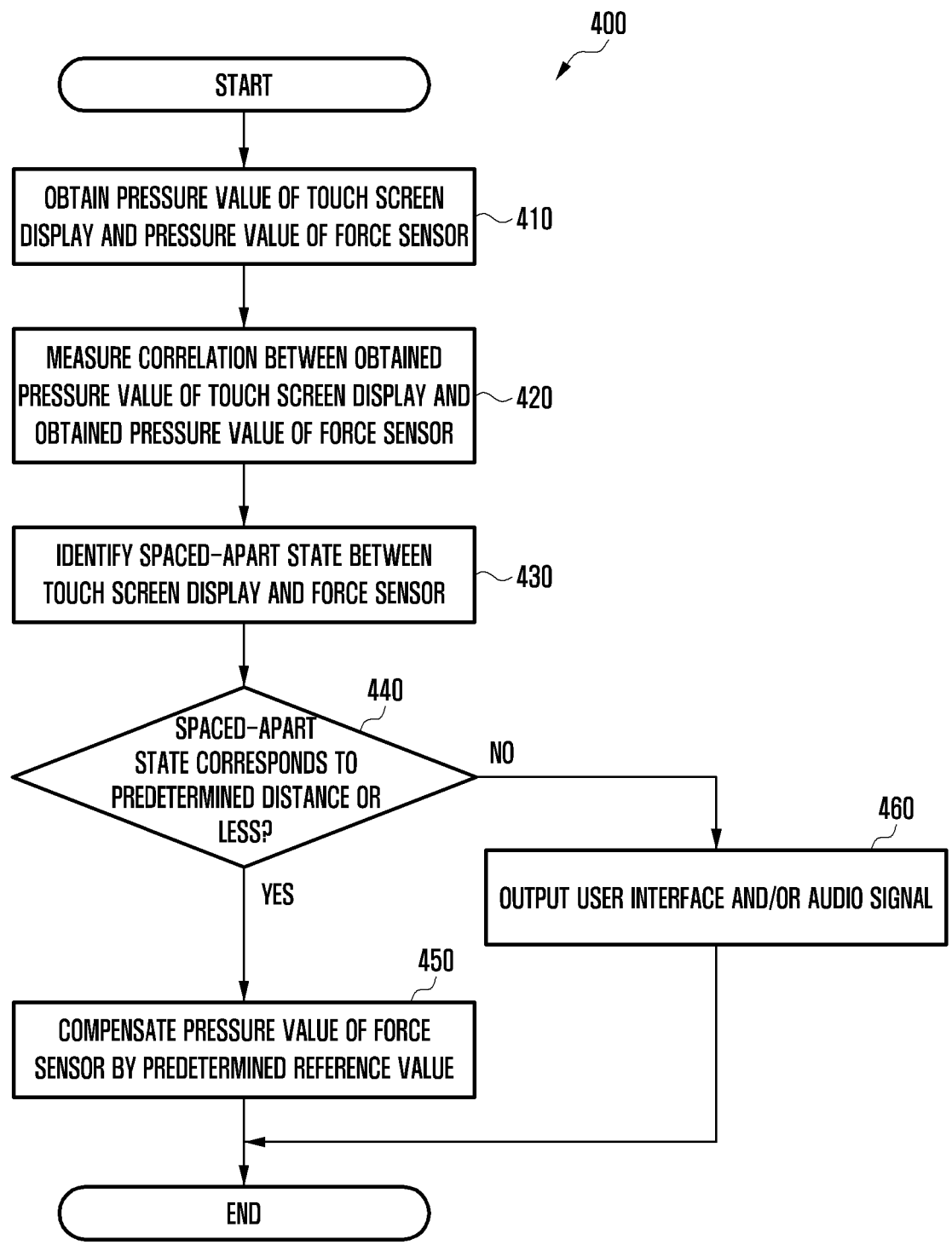
FIG. 4 is a flowchart illustrating a method for compensating a pressure value of a force sensor included in an electronic device according to various embodiments of the disclosure.

FIG. 4 is a flowchart 400 illustrating a method for compensating a pressure value of a force sensor included in an electronic device according to various embodiments of the disclosure.

Operations 410 to 460 in FIG. 4 may be performed by, for example, the electronic device 101 in FIGS. 1 to 3. Hereinafter, the elements in FIGS. 1 to 3 may be used to describe operations 410 to 460. Operations 410 to 460 may be implemented through instructions (commands) that can be executed by the processor 370 of the electronic device 101.

In operation 410, the processor 370 may obtain a user's touch pressure value, input via the touch screen display 201, and a pressure value input via the force sensor 214.

In operation 420, the processor 370 may measure a correlation between the pressure value of the touch screen display 201 and the pressure value of the force sensor 214, which have been obtained in operation 410.

In operation 430, the processor 370 may identify a spaced-apart state between the touch screen display 201 and the force sensor 214 by using the correlation, measured in operation 420, between the pressure value of the touch screen display 201 and the pressure value of the force sensor 214.

According to one embodiment, the processor 370 may identify that the force sensor 214 is spaced a predetermined distance apart from the touch screen display 201 by using the correlation in which the pressure value of the force sensor 214 becomes smaller than the touch pressure value of the touch screen display 201 when a gap is formed between the touch screen display 201 and the force sensor 214.

In operation 440, the processor 370 may determine whether the spaced-apart state between the touch screen display 201 and the force sensor 214 corresponds to a predetermined distance or less.

In operation 450, the processor 370 may compensate, using a predetermined reference value, a pressure value for determining whether to operate the force sensor 214 when the spaced-apart state between the touch screen display 201 and the force sensor 214 corresponds to the predetermined distance or less.

In operation 460, when the spaced-apart state between the touch screen display 201 and the force sensor 214 exceeds the predetermined distance, the processor 370 may determine that the pressure value for determining whether to operate the force sensor 214 cannot be compensated by the predetermined reference value, and may output, via the touch screen display 201 and/or the audio module 360, a user interface and/or audio signal indicating that the spaced-apart state has exceeded the predetermined distance.

Figure 5A:
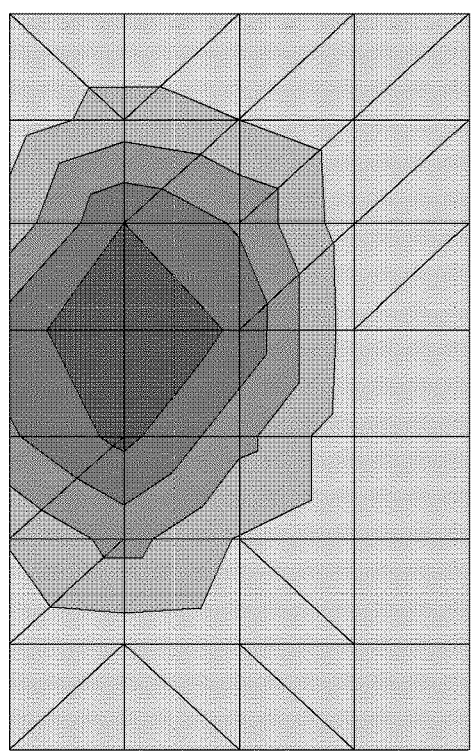
FIG. 5A is a view of an example illustrating the correlation between pressure values of a touch screen display and a force sensor included in an electronic device according to various embodiments of the disclosure.
Figure 5A:
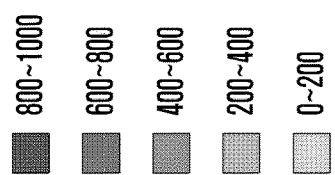
Figure 5A:
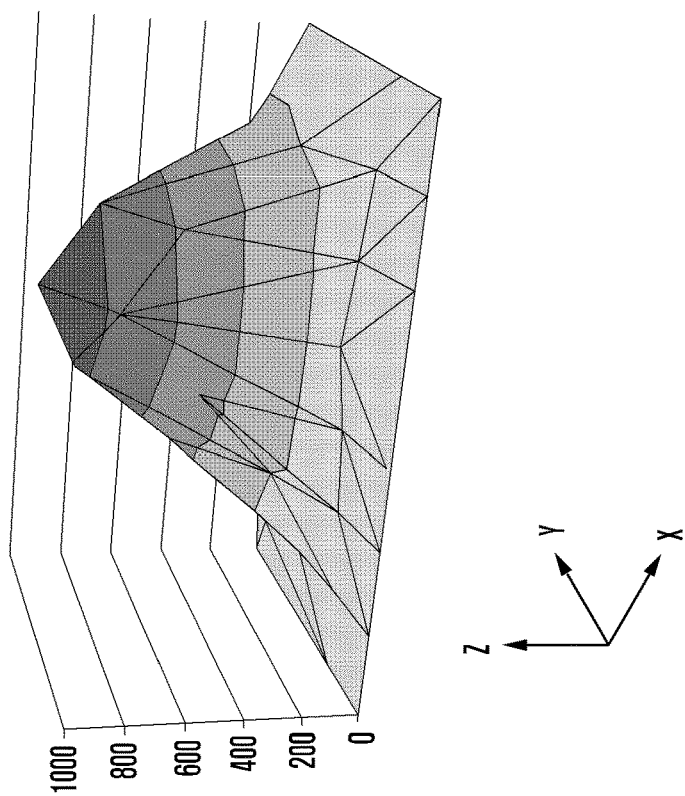
Figure 5B:
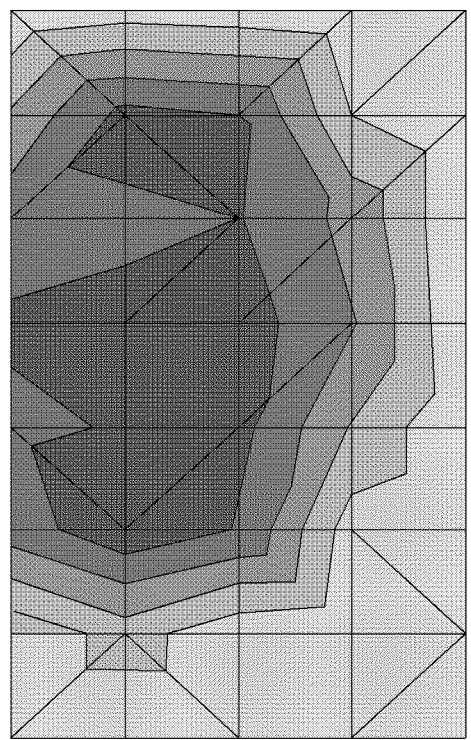
FIG. 5B is a view of another example illustrating the correlation between pressure values of a touch screen display and a force sensor included in an electronic device according to various embodiments of the disclosure.
Figure 5B:
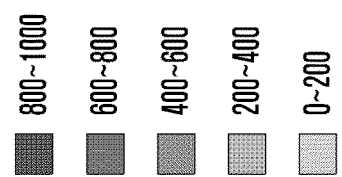
Figure 5B:
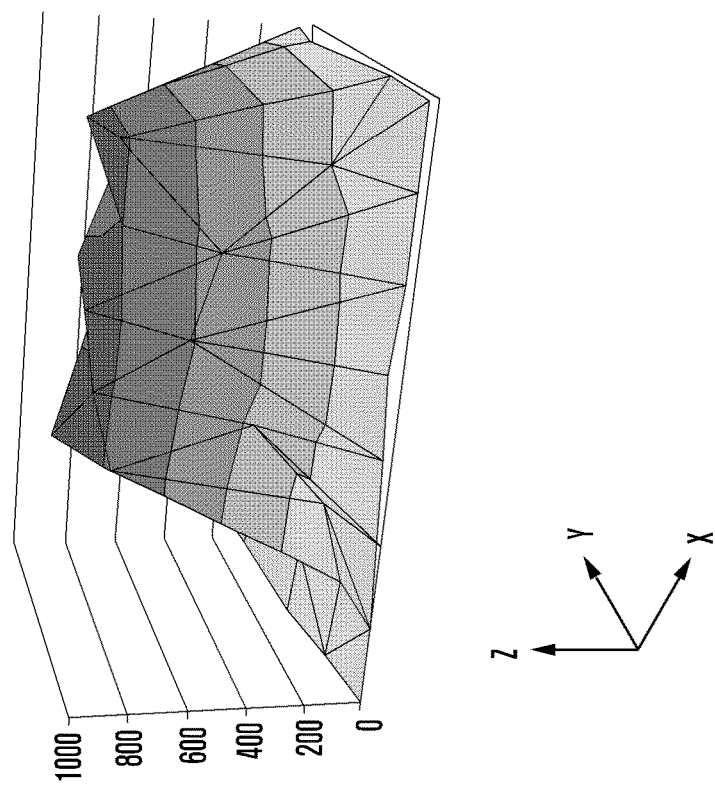
Figure 5C:
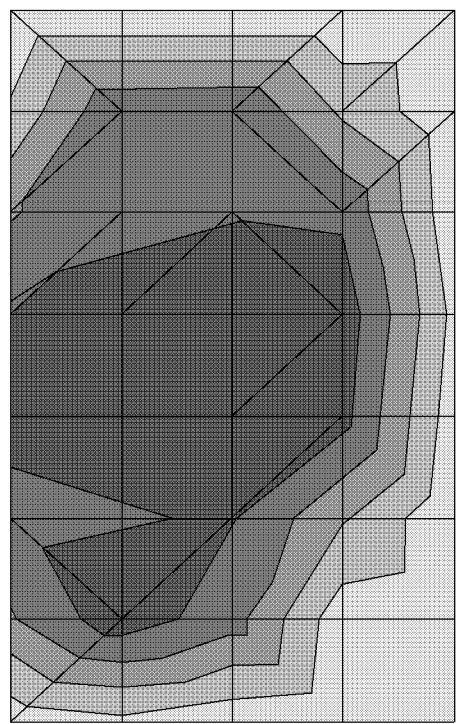
FIG. 5C is a view of another example illustrating the correlation between pressure values of a touch screen display and a force sensor included in an electronic device according to various embodiments of the disclosure.
Figure 5C:
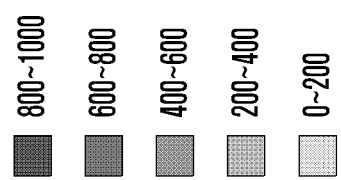
Figure 5C:
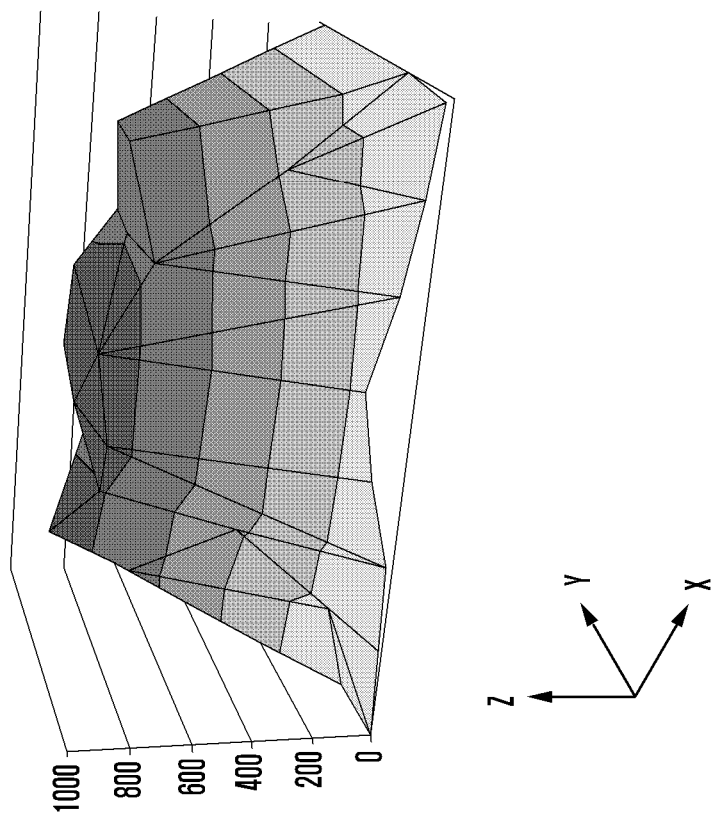

FIGS. 5A to 5C are views illustrating the correlation between pressure values of a touch screen display and a force sensor included in an electronic device according to various embodiments of the disclosure. According to one embodiment, FIGS. 5A to 5C may be views illustrating the sensitivity and area of the touch screen display, which correspond to each level of the pressure value of the force sensor included in an electronic device according to various embodiments of the disclosure.

Referring to FIGS. 5A to 5C, it can be identified that the touch pressure value of the touch screen display 201 according to various embodiments of the disclosure increases in proportion to the pressure value of the force sensor 214.

Referring to FIGS. 5A to 5C, it can be identified that the sensitivity and area of the touch screen display 201 increase in proportion to the pressure value of the force sensor 214. For example, referring to FIGS. 5A to 5C, when the touch screen display 201 is touched, the sensitivity and area corresponding to the pressure value may increase in the transverse direction.

According to one embodiment, the processor 370 may recognize a position input onto the touch screen display 201 by using an X-coordinate and a Y-coordinate. According to one embodiment, a pressure value (e.g. value Z) of the touch screen display 201 may be calculated using a sensitivity and an area based on raw data of the touch panel 303. Referring to FIGS. 5A to 5C, the processor 370 may calculate the pressure value (e.g. value Z) input onto the touch screen display 201, with reference to x, y, and z axes and based on a sensitivity and, in a change value (e.g. a pressure value (e.g. value Z) for the peak in FIGS. 5A to 5C) generated at the time of touch input through the touch screen display 201, an area (e.g. an area touched through the touch screen display 201 on the X-Y plane) corresponding to a pressure value (e.g. value Z) equal to or greater than a threshold value (e.g. 600) pre-configured with reference to the Z-axis (e.g. sensitivity of the touch screen display 201) based on the raw data of the touch panel 303.

For example, the processor 370 may measure a spaced-apart state of the force sensor 214 depending on the pressure value (e.g. value Z) of the touch screen display 201. Referring to FIGS. 5A to 5C, the processor 370 may adjust or compensate an operation range for the pressure value of the force sensor 214 such that the operation range corresponds to the pressure value of the touch screen display 201.

Figure 6:
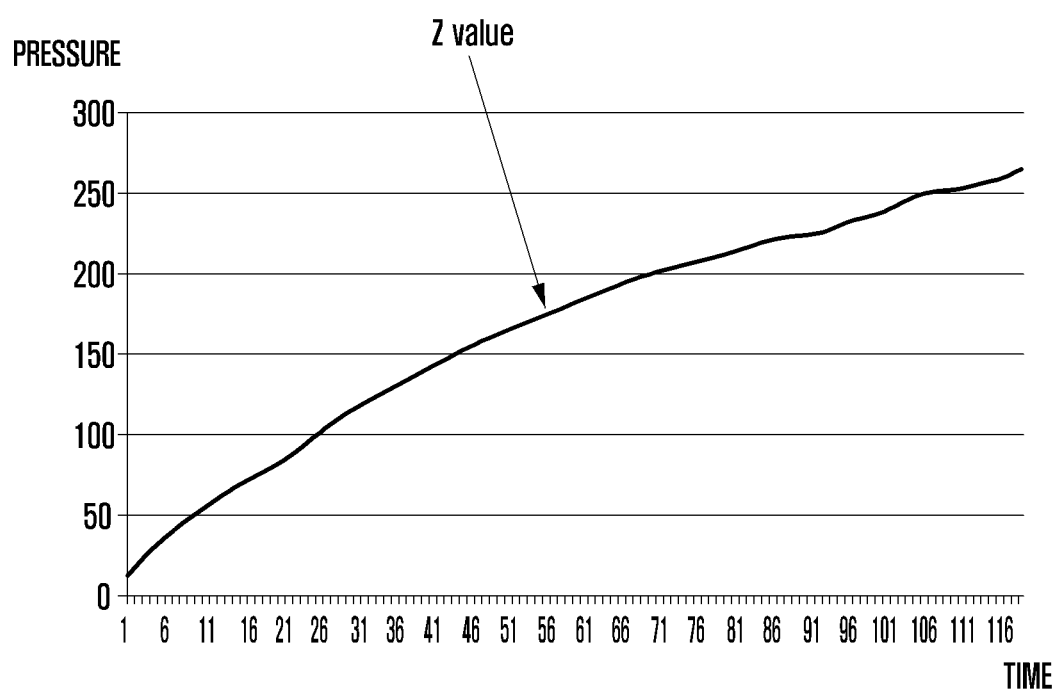
FIG. 6 is a view describing that a pressure value calculated using the sensitivity and area of the touch screen display in the FIGS. 5A to 5C increases in proportion to a pressure value of the force sensor.

FIG. 6 is a view describing that a pressure value calculated using the sensitivity and area of the touch screen display in FIGS. 5A to 5C increases in proportion to a pressure value of the force sensor.

According to one embodiment, a pressure value (e.g. value Z) of the touch screen display 201 may generate a graph corresponding to the pressure axis in FIG. 6.

Referring to FIG. 6, it can be identified that the pressure value (e.g. value Z) of the touch screen display 201 increases in proportion to the pressure value of the force sensor 214.

Figure 7:
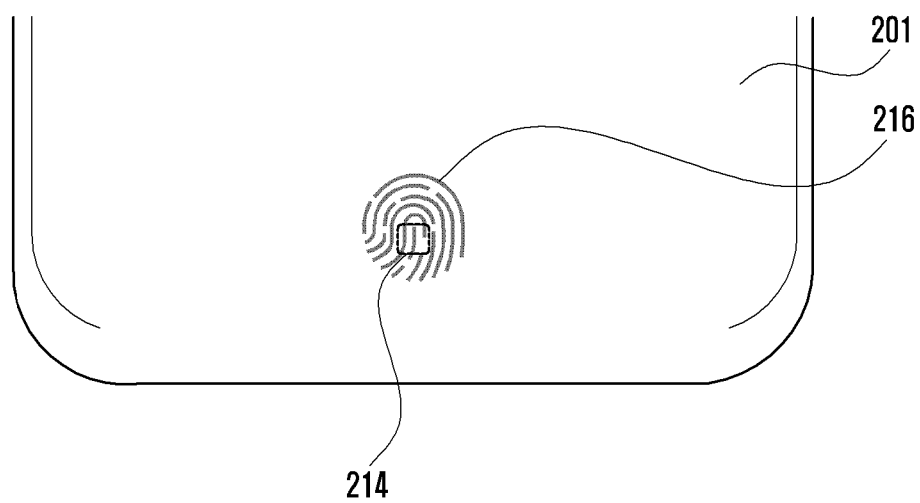
FIG. 7 is a view for describing a process of distinguishing and designating a fingerprint of a user of an electronic device according to various embodiments of the disclosure.

FIG. 7 is a view for describing a process of distinguishing and designating a fingerprint of a user of an electronic device according to various embodiments of the disclosure.

Referring to FIG. 7, in the electronic device 101 according to various embodiments of the disclosure, the force sensor 214 and the fingerprint sensor 216 may be arranged in the same region of the lower portion of the touch screen display 201. The processor 370 of the electronic device 101 may recognize, using the fingerprint sensor 216, a user's fingerprints input in the force sensor 214 through the touch screen display 201, and may divide the fingerprints into a fingerprint of a main finger and a fingerprint of a sub-finger and store the same in the memory 350. For example, the processor 370 may select the fingerprints stored in the memory 350 as main finger candidates, and may designate, as a main finger, a finger corresponding to a fingerprint with which most fingerprint authentication is performed by the fingerprint sensor 216 among the fingerprints selected as the candidates. When multiple fingers for fingerprint authentication are stored in the memory 350, the processor 370 may separately designate a first finger, a second finger, and a third finger, each of which is to be used as a main finger for fingerprint authentication.

Figure 8:
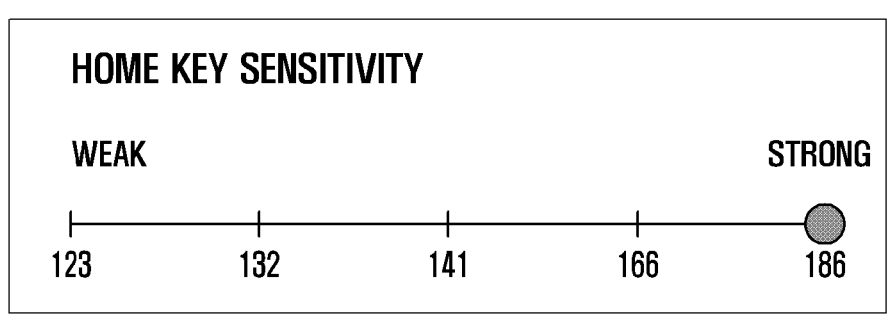
FIG. 8 is a view for describing a process of determining a reference of a pressure value of a touch screen display of an electronic device according to various embodiments of the disclosure.

FIG. 8 is a view for describing a process of determining a reference of a pressure value of a touch screen display of an electronic device according to various embodiments of the disclosure.

Referring to FIG. 8, the processor 370 of the electronic device 101 according to various embodiments of the disclosure may obtain a pressure value of the force sensor 214 when a user presses a home key 218 region using a main finger. The processor 370 may determine, for each level (e.g. a first level to a fifth level), a reference of a pressure value of the touch screen display 201 depending on the pressure value of the force sensor 214. The reference of the pressure value of the touch screen display 201 may be a reference value for measuring a spaced-apart state of the force sensor 214.

According to one embodiment, when a user of the electronic device 101 presses the home key 218 region by using a main finger a predetermined number of times, the processor 370 may obtain a pressure value of the touch screen display 201 corresponding to a pressure value of the force sensor 214 for each level. According to one embodiment, when pressure values of the force sensor 214 when the home key 218 region is pressed a predetermined number of times are obtained, the processor 370 may configure, as a reference, an average of pressure values of the touch screen display 201 corresponding thereto during the predetermined number of times.

Figure 9:
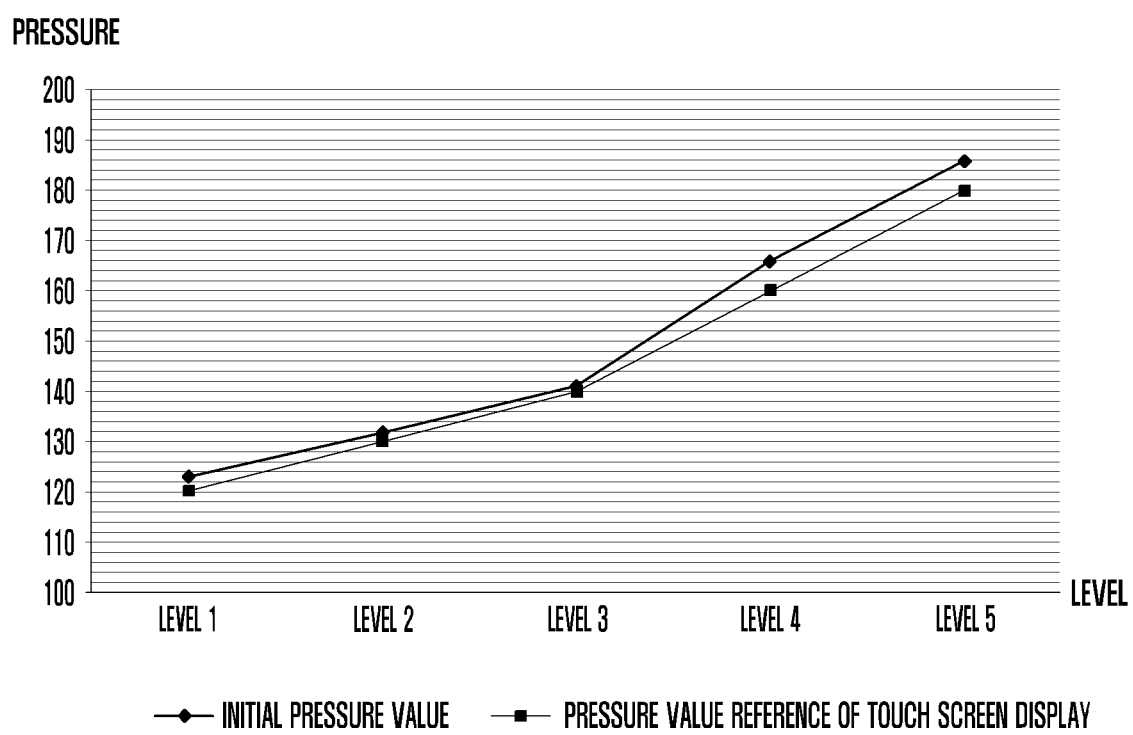
FIG. 9 is a view for describing a level-specific reference configuration for a pressure value of a touch screen display corresponding to a pressure value of a force sensor of an electronic device according to various embodiments of the disclosure.

FIG. 9 is a view for describing a level-specific reference configuration for a pressure value of a touch screen display corresponding to a pressure value of a force sensor of an electronic device according to various embodiments of the disclosure.

Referring to FIG. 9, the processor 370 may configure references for levels (e.g. a first level to a fifth level) of pressure values of the touch screen display 201 corresponding to initial pressure values of the force sensor 214.

According to one embodiment, the references for levels (a first level to a fifth level) of pressure values of the touch screen display 201 corresponding to initial pressure values of the force sensor 214 may be configured as in Table 1 below and stored in the memory 350.

TABLE 1

|  | First level | Second level | Third level | Fourth level | Fifth level |
| --- | --- | --- | --- | --- | --- |
| Initial pressure value | 123 | 132 | 141 | 166 | 186 |
| Reference of pressure value of touch screen display | 120 | 130 | 140 | 160 | 180 |

Referring to FIG. 9, ♦ may indicate an initial pressure value of the force sensor 214, and ■ may indicate a reference of a pressure value of the touch screen display 201.

According to one embodiment, when the force sensor 214 and the fingerprint sensor 216 are arranged in the same region of the lower portion of the touch screen display 201, the processor 370 may recognize fingerprints of fingers input through the force sensor 214, and may configure, as a reference, an average of pressure values of the touch screen display 201 for levels through a pressure value of the touch screen display 201 for each finger stored in the memory 350. For example, when fingerprints of the thumb and the index finger of a user of the electronic device 101 are stored in the memory 350 and the fingerprints of the thumb and the index finger are input to the force sensor 214 and the fingerprint sensor 216, the processor 370 may obtain pressure values of the touch screen display 201 corresponding to the fingerprints of the thumb and the index finger, and may compare the obtained pressure values with references of the pressure values of the touch screen display 201 for levels with respect to each finger.

According to one embodiment, the references for levels of pressure values of the touch screen display 201 for fingers (e.g. the thumb and the index finger), corresponding to initial pressure values of the force sensor 214, may be configured as in Table 2 below and stored in the memory 350.

TABLE 2

|  | First level | Second level | Third level | Fourth level | Fifth level |
| --- | --- | --- | --- | --- | --- |
| Initial pressure value | 123 | 132 | 141 | 166 | 186 |
| Reference of thumb pressure value of touch screen display | 120 | 130 | 140 | 160 | 180 |

TABLE 2-continued

|  | First level | Second level | Third level | Fourth level | Fifth level |
| --- | --- | --- | --- | --- | --- |
| Reference of index finger pressure value of touch screen display | 100 | 107 | 115 | 122 | 127 |

Figure 10:
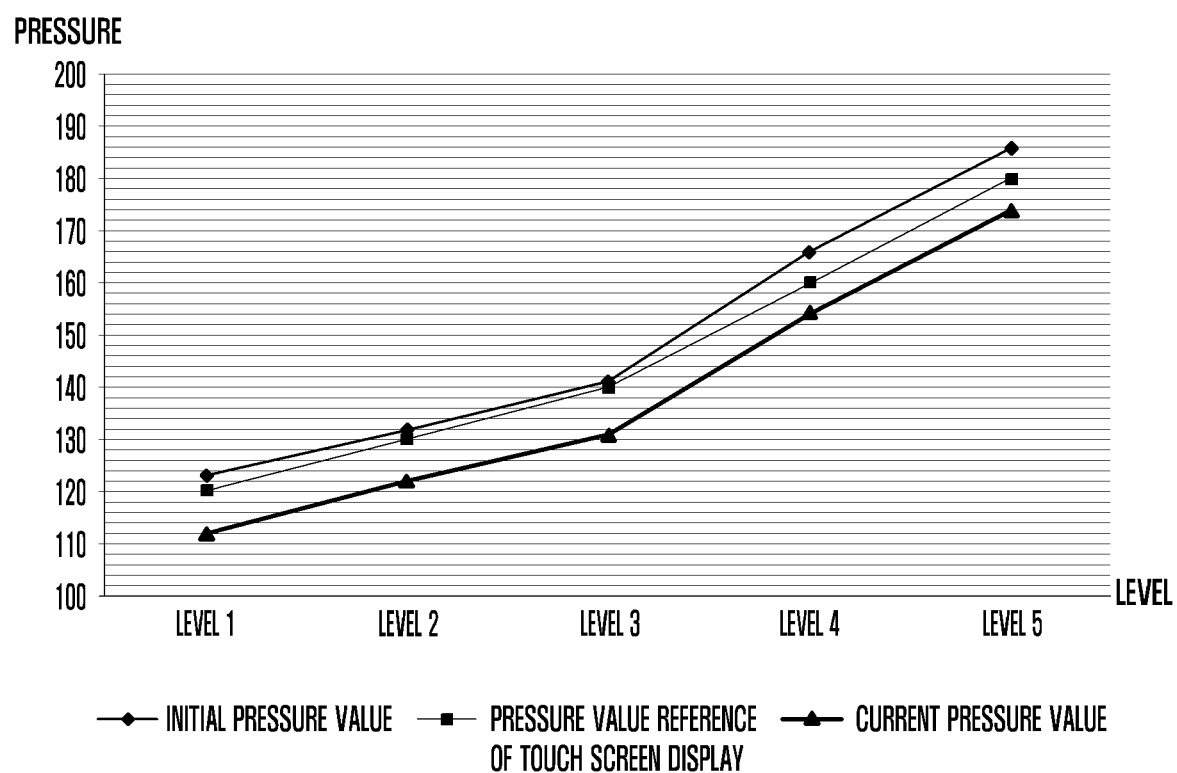
FIG. 10 is a view for describing a process of measuring a spaced-apart state between a touch screen display and a force sensor of an electronic device according to various embodiments of the disclosure.

FIG. 10 is a view for describing a process of measuring a spaced-apart state between a touch screen display and a force sensor of an electronic device according to various embodiments of the disclosure.

When a user touches the touch screen display 201, the processor 370 may obtain a current pressure value of the force sensor 214. Referring to FIG. 10, ♦ may indicate an initial pressure value of the force sensor 214, ■ may indicate a reference of a pressure value of the touch screen display 201, and ▲ may indicate a current pressure value of the force sensor 214.

According to one embodiment, the processor 370 may measure a spaced-apart state between the touch screen display 201 and the force sensor 214 by using: a reference of a pressure value of the touch screen display 201 corresponding to a pressure value of the force sensor 214 for each level; and the difference between an initial pressure value and a current pressure value of the force sensor 214.

According to one embodiment, references for levels of pressure values of the touch screen display 201 for fingers (e.g. the thumb and the index finger) corresponding to the initial pressure values of the force sensor 214 and current pressure values of the force sensor 214 may be configured as in Table 3 below.

TABLE 3

|  | First level | Second level | Third level | Fourth level | Fifth level |
| --- | --- | --- | --- | --- | --- |
| Initial pressure value | 123 | 132 | 141 | 166 | 186 |
| Reference of pressure value of touch screen display | 120 | 130 | 140 | 160 | 180 |
| Current pressure value | 112 | 122 | 131 | 154 | 174 |
| Pressure value difference | −11 | −10 | −10 | −12 | −12 |

Referring to Table 3, it can be found that the pressure value differences for levels (e.g. a first level to a fifth level) between initial pressure values and current values of the force sensor 214 are −11, −10, −10, −12, and −12. For example, a compensation value of the pressure value differences may be configured to be 10. Since the compensation value of the pressure value differences is 10, the processor 370 may compensate pressure values of the force sensor 214 as shown in Table 4 below.

TABLE 4

|  | First level | Second level | Third level | Fourth level | Fifth level |
|---|---|---|---|---|---|
| Compensated threshold value | 113 | 122 | 131 | 156 | 176 |

Referring to Table 4, in the first level, an initial threshold (e.g. 123 in Table 3) may be compensated by a compensation value (e.g. 10), and thus a compensated threshold value may be 113. The same method as used in the first level may also be used in the second level, the third level, the fourth level, and the fifth level. Therefore, initial threshold values (e.g. 132, 141, 166, and 186 in Table 3) may be compensated by a compensation value (e.g. 10), and thus compensated threshold values may be 122, 131, 156, and 176.

Figure 11:
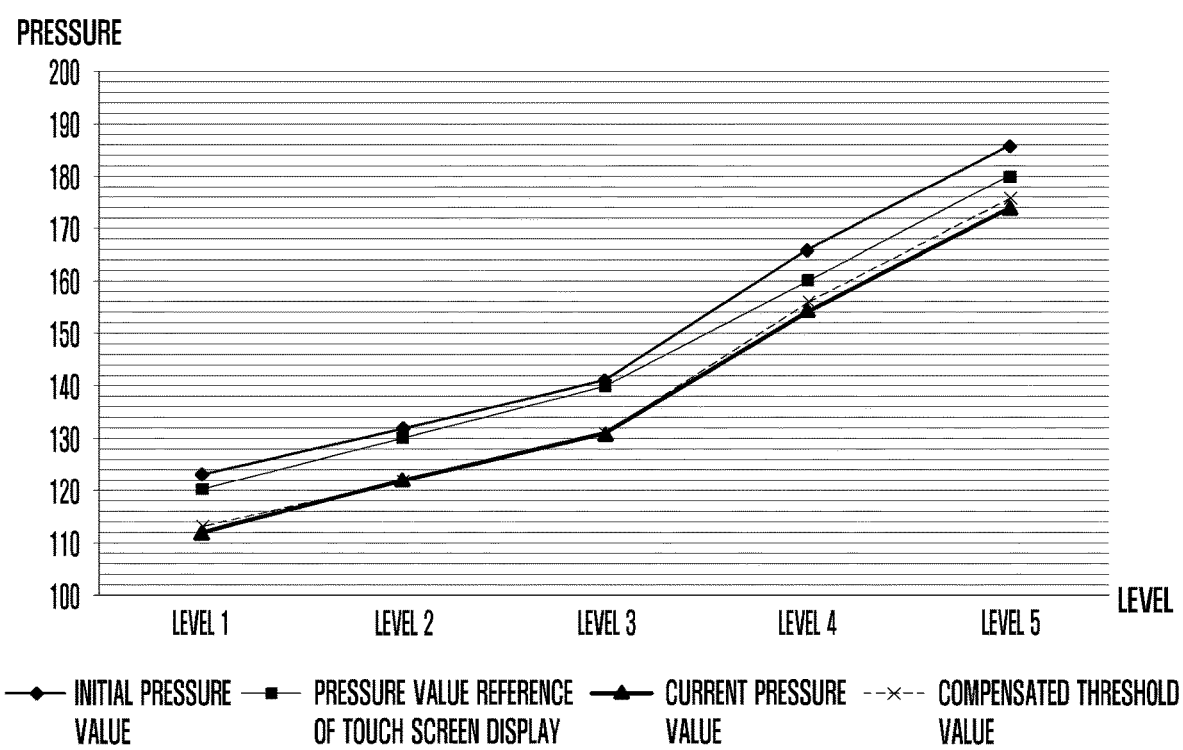
FIG. 11 is a view for describing an embodiment of measuring a spaced-apart state between a touch screen display and a force sensor of an electronic device according to various embodiments of the disclosure and compensating a pressure value of the force sensor.

FIG. 11 is a view for describing an embodiment of measuring a spaced-apart state between a touch screen display and a force sensor of an electronic device according to various embodiments of the disclosure and compensating a pressure value of the force sensor.

Referring to FIG. 11, ♦ may indicate an initial pressure value of the force sensor 214, ■ may indicate a reference of a pressure value of the touch screen display 201, ▲ may indicate a current pressure value of the force sensor 214, and X may indicate a compensated threshold value of the force sensor 214.

Referring to FIG. 11 and Table 4, in relation to compensation for current pressure values of the force sensor 214, it can be found that compensated threshold values of the first level, the second level, the third level, the fourth level, and the fifth level have been obtained through compensation by a compensation value (e.g. 10).

Referring to FIG. 11, with respect to pressure value references of the touch screen display 201 and to current pressure values and initial pressure values of the force sensor 214, for example, the pressure values of the force sensor 214 may be compensated using references and pressure value differences for levels such as a first level to a fifth level.

Figure 12:
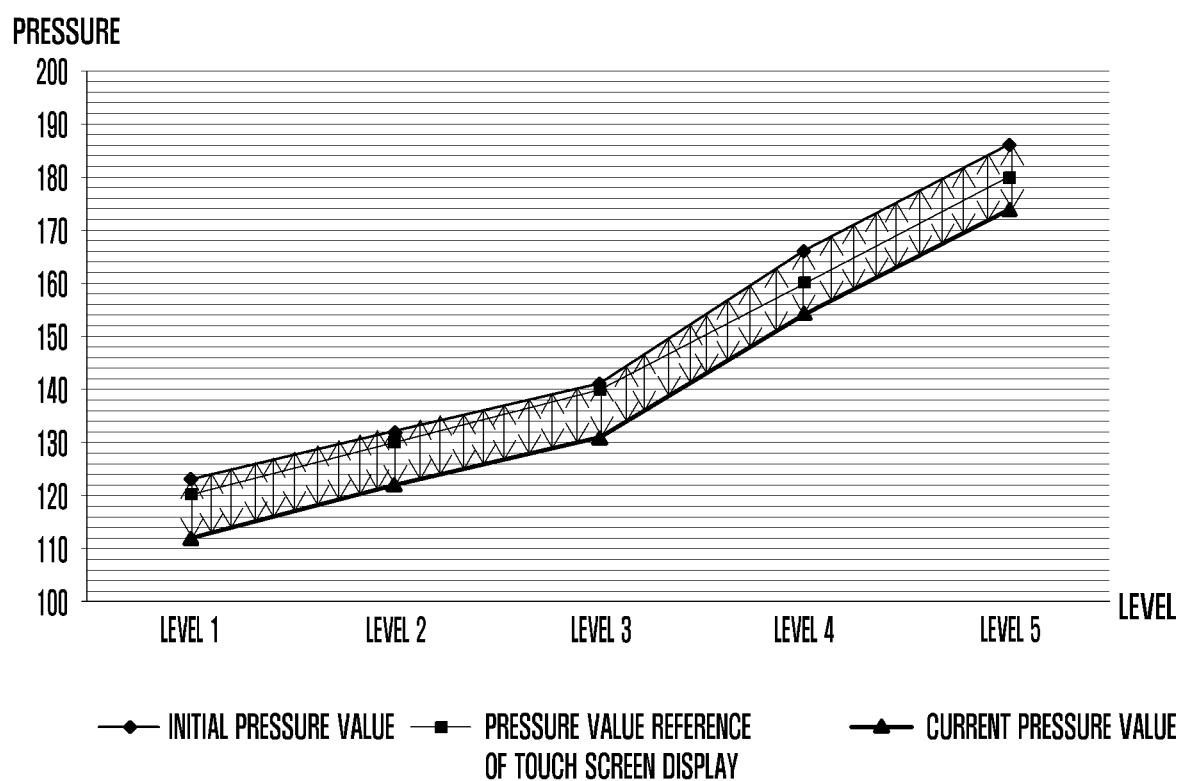
FIG. 12 is a view for describing another embodiment of measuring a spaced-apart state between a touch screen display and a force sensor of an electronic device according to various embodiments of the disclosure and compensating a pressure value of the force sensor.

FIG. 12 is a view for describing another embodiment of measuring a spaced-apart state between a touch screen display and a force sensor of an electronic device according to various embodiments of the disclosure and compensating a pressure value of the force sensor.

Referring to FIG. 12, ♦ may indicate an initial pressure value of the force sensor 214, ■ may indicate a reference of a pressure value of the touch screen display 201, and ▲ may indicate a current pressure value of the force sensor 214.

According to various embodiments of the disclosure, the levels are not limited to the first level to the fifth level of FIG. 11 described above. As illustrated in FIG. 12, the levels may be subdivided into at least one level or into n or more levels, pressure value references of the touch screen display 201 may be determined, and the pressure values of the force sensor 214 may be compensated. That is, the processor 370 of the electronic device 101 may subdivide the at least one level and continuously calculate pressure value differences between the touch screen display 201 and the force sensor 214, thereby increasing the accuracy of a compensation value.

Figure 13:
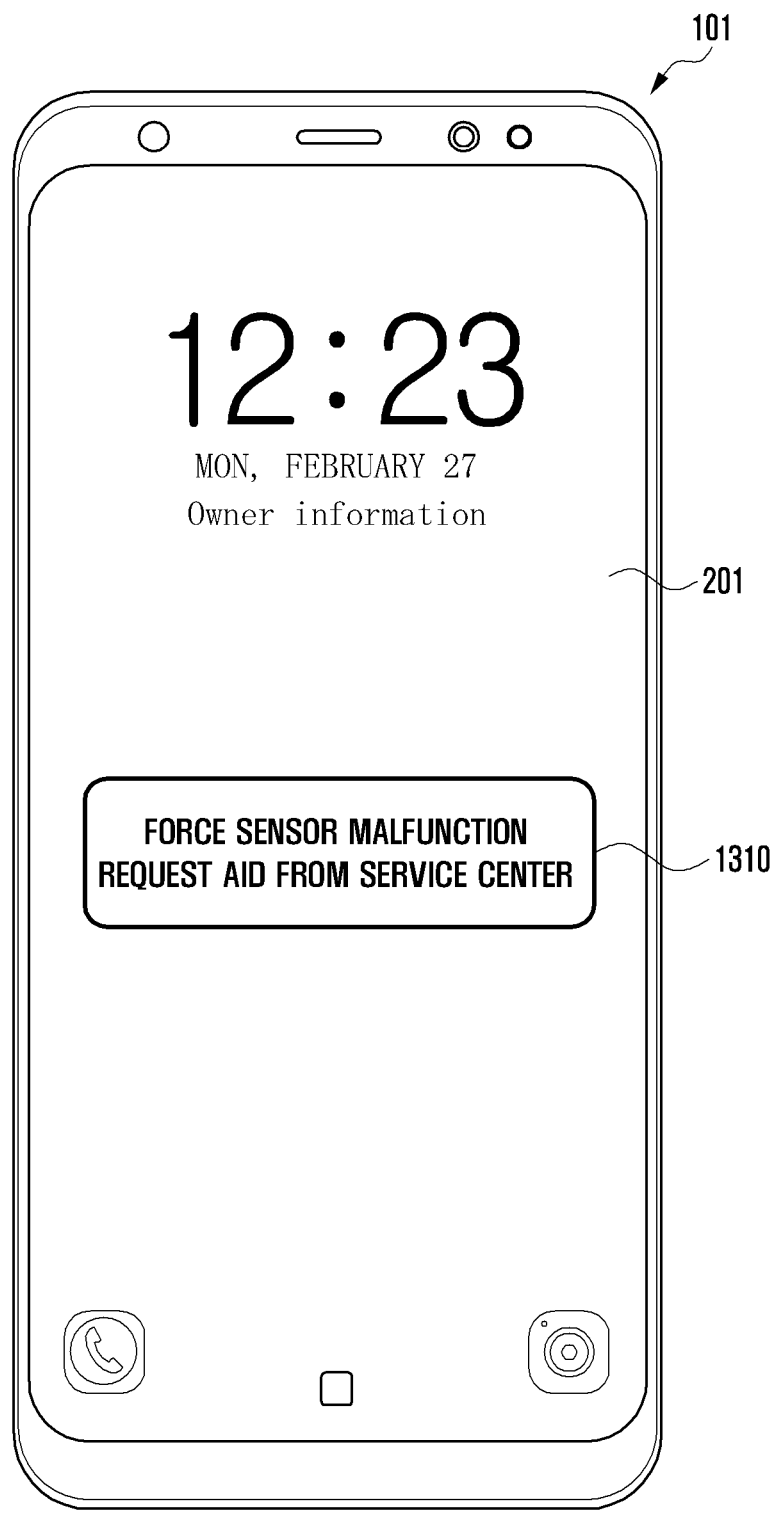
FIG. 13 is a view illustrating an example of a user interface for indicating a spaced-apart state between a touch screen display and a force sensor of an electronic device according to various embodiments of the disclosure.

FIG. 13 is a view illustrating an example of a user interface for indicating a spaced-apart state between a touch screen display and a force sensor of an electronic device according to various embodiments of the disclosure.

Referring to FIG. 13, the processor 370 of the electronic device 101 according to various embodiments of the disclosure may display a user interface 1310 for indicating a malfunction of the force sensor 214 in a predetermined region of the touch screen display 201 when a spaced-apart state between the touch screen display 201 and the force sensor 214 exceeds a predetermined distance and thus a pressure value of the force sensor 214 cannot be compensated. When a gap is formed between the touch screen display 201 and the force sensor 214, the processor 370 may output an audio signal (not shown), indicating the malfunction of the force sensor 214, via the audio module 360.

Figure 14:
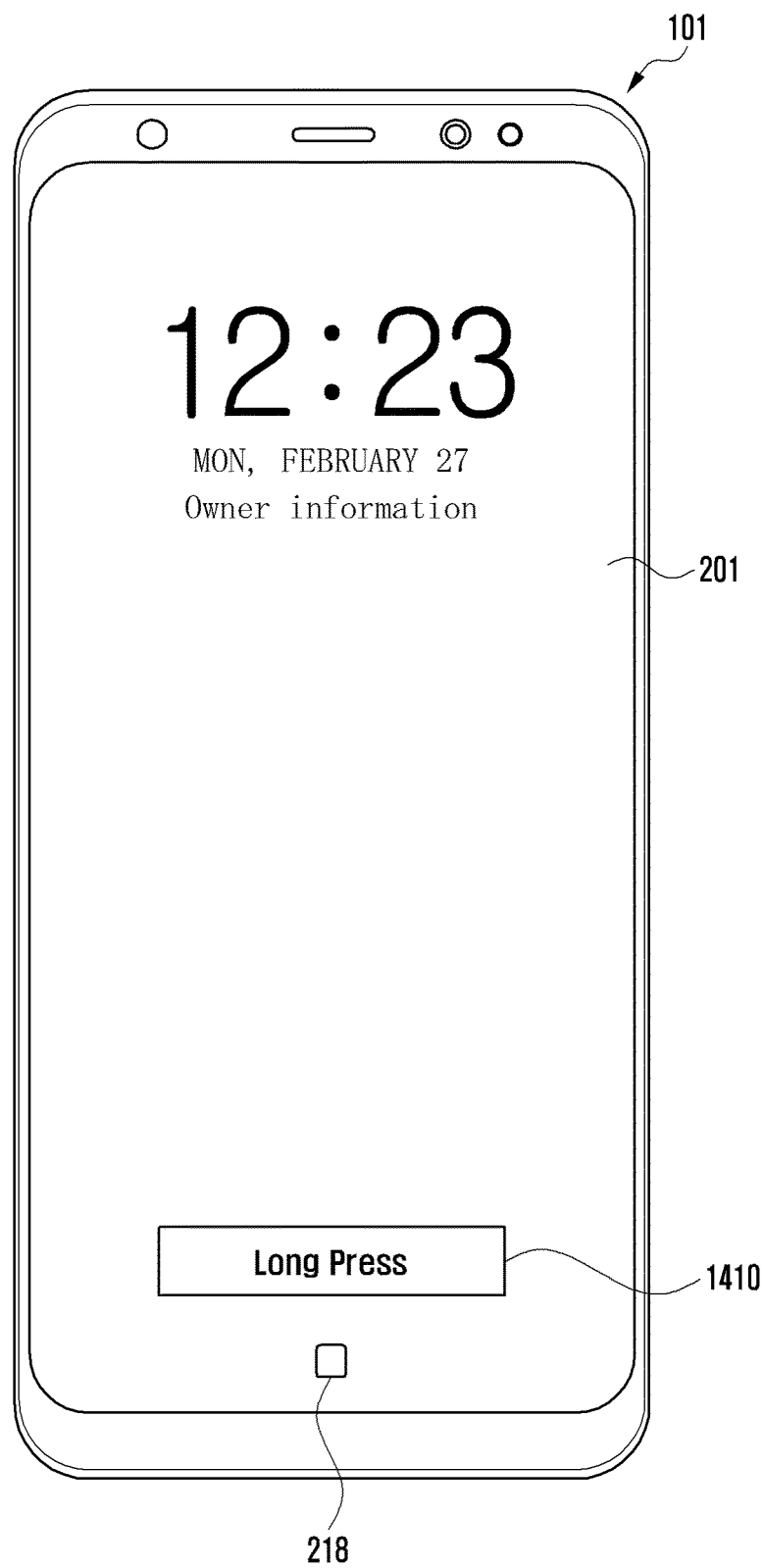
FIG. 14 is a view illustrating an example of a user interface when a force sensor of an electronic device according to various embodiments of the disclosure malfunctions.

FIG. 14 is a view illustrating an example of a user interface when a force sensor of an electronic device according to various embodiments of the disclosure malfunctions.

Referring to FIG. 14, when a spaced-apart state between the touch screen display 201 and the force sensor 214 exceeds a predetermined distance and thus a pressure value of the force sensor 214 cannot be compensated, the processor 370 of the electronic device 101 according to various embodiments of the disclosure may display, for example, a user interface 1410, in which the home key 218 can be long pressed, so as to induce long-press input by a user.

Figure 15:
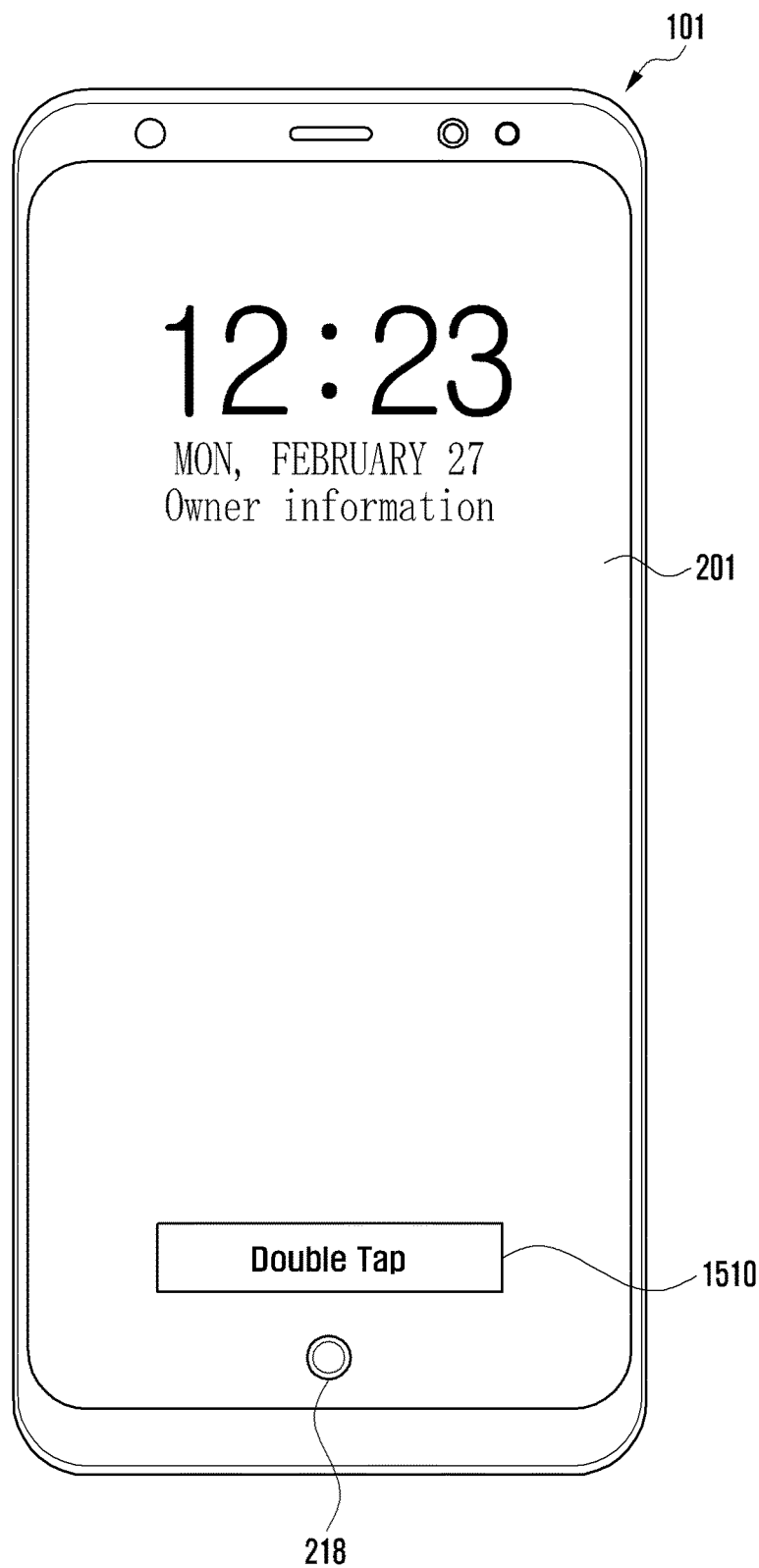
FIG. 15 is a view illustrating another example of a user interface when a force sensor of an electronic device according to various embodiments of the disclosure malfunctions.

FIG. 15 is a view illustrating another example of a user interface when a force sensor of an electronic device according to various embodiments of the disclosure malfunctions.

Referring to FIG. 15, when a spaced-apart state between the touch screen display 201 and the force sensor 214 exceeds a predetermined distance and thus a pressure value of the force sensor 214 cannot be compensated, the processor 370 of the electronic device 101 according to various embodiments of the disclosure may display, for example, a user interface 1510, in which the home key 218 can be double tapped, so as to induce double-tap input by a user.

Figure 16:
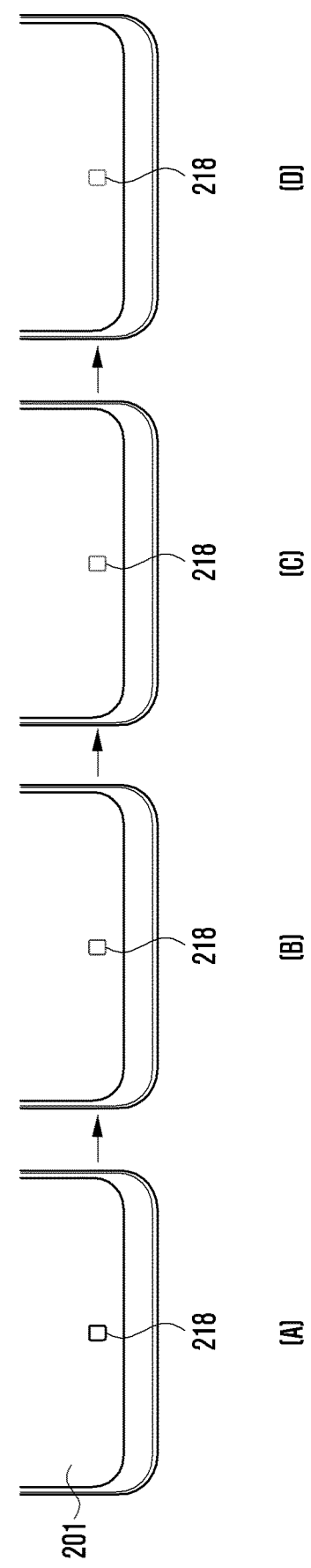
FIG. 16 is a view illustrating an example of display of a home key based on a spacing distance between a touch screen display and a force sensor of an electronic device according to various embodiments of the disclosure.

FIG. 16 is a view illustrating an example of display of a home key based on a spacing distance between a touch screen display and a force sensor of an electronic device according to various embodiments of the disclosure.

Referring to FIGS. 16A to 16D, the color of the home key 218 may be displayed differently depending on the spacing distance for each level between the touch screen display 201 and the force sensor 214 of the electronic device 101 according to various embodiments of the disclosure. According to one embodiment, the home key 218 may be formed as a touch key.

Referring to FIG. 16A, when a spaced-apart state between the touch screen display 201 and the force sensor 214 is normal, the color of the home key 218 may be displayed as black.

Referring to FIG. 16B, when the spaced-apart state between the touch screen display 201 and the force sensor 214 corresponds to a predetermined distance or less, the color of the home key 218 may be displayed as blue.

Referring to FIG. 16C, when the spaced-apart state between the touch screen display 201 and the force sensor 214 corresponds to a predetermined distance or more, the color of the home key 218 may be displayed as violet.

Referring to FIG. 16D, when the spaced-apart state between the touch screen display 201 and the force sensor 214 exceeds a predetermined distance and thus a pressure value of the force sensor 214 cannot be compensated, the color of the home key 218 may be displayed as red.

Therefore, according to various embodiments of the disclosure, when a gap is formed between the touch screen display 201 and the force sensor 214 of the electronic device 101, user usability can be improved by sensing a spaced-apart state for each level in real time and compensating a pressure value of the force sensor 214.

Further, a user may be quickly informed of the spaced-apart state between the touch screen display 201 and the force sensor 214 of the electronic device 101 via the touch screen display 201 and/or the audio module 360.

Hereinbefore, the disclosure has been described according to various embodiments of the disclosure. However, it is natural that modifications and changes made by a person skilled in the art to which the disclosure belongs without departing from the technical idea of the disclosure fall within the disclosure.

The invention claimed is:

1. An electronic device comprising:
a touch screen display;
a force sensor bonded to a lower portion of the touch screen display;
a memory; and
a processor electrically connected to the touch screen display, the force sensor, and the memory, wherein the processor is configured to:
obtain a pressure value of the touch screen display and a pressure value of the force sensor,
measure a correlation between the obtained pressure value of the touch screen display and the pressure value of the force sensor,
identify a spaced-apart state between the touch screen display and the force sensor by using the correlation,
determine whether the spaced-apart state corresponds to a predetermined distance or less, and
compensate, using a predetermined reference value, a pressure value for determining whether to operate the force sensor when the spaced-apart state corresponds to the predetermined distance or less.

2. The electronic device of claim 1, wherein the processor is configured to:
when the spaced-apart state exceeds the predetermined distance, display, via the touch screen display, a user interface for indicating that the spaced-apart state has exceeded the predetermined distance; or
output, via an audio module, an audio signal for indicating that the spaced-apart state has exceeded the predetermined distance.

3. The electronic device of claim 1, wherein the processor is configured to identify the spaced-apart state by using a correlation in which the pressure value of the force sensor becomes smaller than the pressure value of the touch screen display when a gap is formed between the touch screen display and the force sensor.

4. The electronic device of claim 1, wherein the processor is configured to:
when a gap is formed between the touch screen display and the force sensor, display, via the touch screen display, a user interface for indicating the formation of the gap; or
output, via an audio module, an audio signal for indicating the formation of the gap.

5. The electronic device of claim 1, wherein the processor configures, at one or more levels, the pressure value of the touch screen display corresponding to the pressure value of the force sensor.

6. The electronic device of claim 1, wherein the processor is configured to measure the spaced-apart state by using a difference between an initial pressure value of the force sensor, stored in the memory, and a current pressure value input to the force sensor via the touch screen display.

7. The electronic device of claim 1, further comprising:
a predetermined functional key,
wherein the processor is configured to differently display a color of the predetermined functional key depending on a spacing distance between the touch screen display and the force sensor.

8. The electronic device of claim 1, further comprising:
a fingerprint sensor,
wherein the processor is configured to:
recognize a user's fingerprint, input via the touch screen display, through the fingerprint sensor, and
configure a fingerprint, with which fingerprint authentication has been performed via the fingerprint sensor a predetermined number of times or more, as a fingerprint to be used to authenticate the electronic device.

9. A method for compensating a pressure value of a force sensor included in an electronic device, the method comprising:
obtaining, by a processor, a pressure value of a touch screen display and a pressure value of the force sensor;
measuring, by the processor, a correlation between the obtained pressure value of the touch screen display and the pressure value of the force sensor;
identifying, by the processor, a spaced-apart state between the touch screen display and the force sensor by using the correlation;
determining whether the spaced-apart state corresponds to a predetermined distance or less; and
compensating, using a predetermined reference value, a pressure value for determining whether to operate the force sensor when the spaced-apart state corresponds to the predetermined distance or less.

10. The method of claim 9, further comprising performing control by the processor such that, when the spaced-apart state exceeds the predetermined distance, a user interface for indicating that the spaced-apart state has exceeded the predetermined distance is displayed via the touch screen display, or an audio signal for indicating that the spaced-apart state has exceeded the predetermined distance is output via an audio module.

11. The method of claim 9, further comprising performing control by the processor such that, when a gap is formed between the touch screen display and the force sensor displays, a user interface for indicating the formation of the gap is displayed via the touch screen display, or an audio signal for indicating the formation of the gap is output via an audio module.

12. The method of claim 9, further comprising:
performing control by the processor such that a pressure value of the touch screen display corresponding to a pressure value of the force sensor is configured at one or more levels; and
performing control by the processor such that the spaced-apart state is measured using a difference between an initial pressure value of the force sensor stored in a memory and a current pressure value input to the force sensor via the touch screen display.

13. The method of claim 9, further comprising performing control by the processor such that a color of a predetermined functional key is displayed differently depending on a spacing distance between the touch screen display and the force sensor.

14. The method of claim 9, further comprising performing control by the processor such that:
a user's fingerprint input via the touch screen display is recognized through a fingerprint sensor; and a fingerprint, with which fingerprint authentication has been performed through the fingerprint sensor a predetermined number of times or more, is configured as a fingerprint to be used to authenticate the electronic device.

15. A non-transitory computer-readable storage medium, which has stored therein a program for carrying out a method for compensating a pressure value of a force sensor included in an electronic device, the method comprising:

obtaining a pressure value of a touch screen display and a pressure value of the force sensor;

measuring a correlation between the obtained pressure value of the touch screen display and the pressure value of the force sensor;

identifying a spaced-apart state between the touch screen display and the force sensor by using the correlation;

determining whether the spaced-apart state corresponds to a predetermined distance or less; and compensating, using a predetermined reference value, a pressure value for determining whether to operate the force sensor when the spaced-apart state corresponds to the predetermined distance or less.

* * * * *